April 26, 1932. D. E. ENRIGHT 1,855,627
SHOCK ABSORBING CONNECTING ROD
Filed Oct. 24, 1928
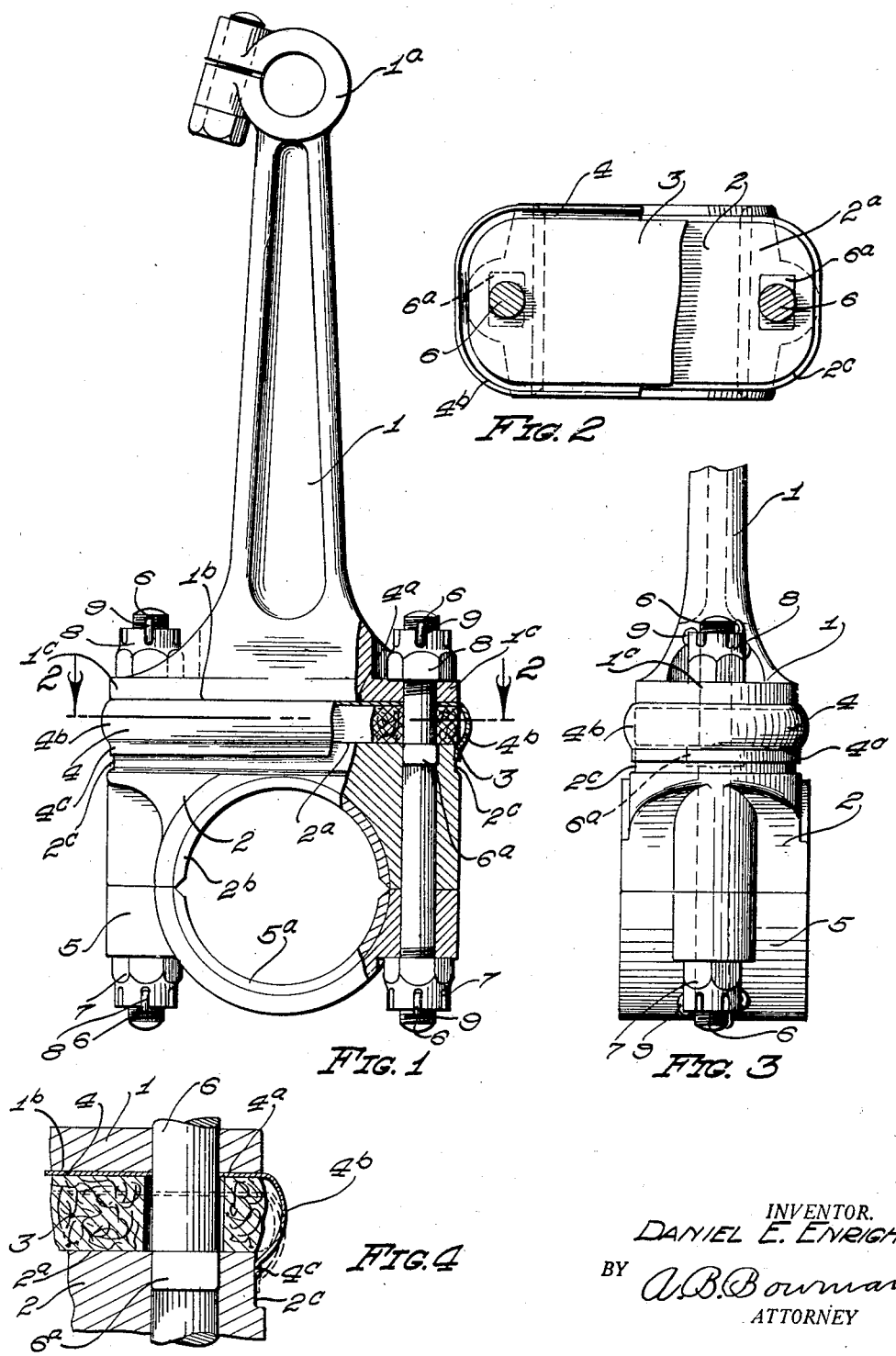
INVENTOR.
DANIEL E. ENRIGHT
BY A.B.Bowman
ATTORNEY Patented Apr. 26, 1932

1,855,627

UNITED STATES PATENT OFFICE

DANIEL E. ENRIGHT, OF SAN DIEGO, CALIFORNIA

SHOCK ABSORBING CONNECTING ROD

Application filed October 24, 1928. Serial No. 314,628.

My invention relates to connecting rods, more particularly to shock absorbing connecting rods, and the objects of my invention are: First, to provide a connecting rod in which slight lateral movement is permitted between the ends thereof; second, to provide a device of this class in which the percussive action due to the explosion of fuel in the firing chamber of an internal combustion engine is cushioned thereby reducing to minimum the pounding upon the crank shaft and resulting destruction of the bearings and other working parts of the engine; third, to provide a device of this class which reduces to a minimum the vibration of an internal combustion engine caused by the impact action of the connecting rods upon the crank shaft; fourth, to provide a device of this class which absorbs the percussive action which accompanies the explosion which takes place in an internal combustion engine and redelivers the force of this percussive action without the shock of percussion; fifth, to provide a device of this class which reduces the wear and tear upon an internal combustion engine; sixth, to provide a device of this class which may be easily substituted in place of the conventional connecting rod; seventh, to provide a device of this class in which the resilient portions thereof may be easily removed or replaced without disconnecting the connecting rod from the piston or removing the piston from its cylinder; eighth, to provide a device of this class which may be made lighter than the conventional connecting rod as the resilient means thereof absorb the extra or peak force occurring during the explosion for which the ordinary connecting rod must be built to stand; and ninth, to provide a device of this class which is simple of construction proportion to its functions, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the acompanying drawings and to the characters of reference thereon which form a part of this application in which:

Figure 1 is an elevational view of a connecting rod embodying my invention with parts and portions broken away and in section to facilitate the illustration; Fig. 2 is a transverse sectional view thereof through 2—2 of Fig. 1 with a portion of the resilient means and cam member removed in order to facilitate the illustration; Fig. 3 is a fragmentary side elevational view thereof; and Fig. 4 is an exaggerated fragmentary sectional view showing the movement of the resilient means and the cap therefor when the connecting rod receives an explosive or percussive blow.

Similar characters of reference refer to similar parts and portions throughout the several views of the drawings.

Shank member 1, bearing member 2, resilient pad 3, resilient pad cap 4, bearing cap member 5, bolt members 6, nuts 7 and 8, and cotter pins 9, constitute the principal parts and portions of my connecting rod.

The shank member 1 is provided with a conventional upper portion $1a$ which is adapted to be secured by any type of a wrist pin or other means to a piston. The lower portion $1b$ is widened in a direction longitudinally with the crank shaft until it is approximately the length of the crank shaft connecting rod bearing. The lower portion $1b$ is widened transversely to the crank shaft forming ear portions $1c$. The lower surface of the lower portion $1b$ is preferably flat. It is spaced apart from the upper preferably flat surface $2a$ of a bearing member 2, by means of a resilient pad member 3 which may be made out of rubber, leather, fabric, or a combination of such elements so as to provide slight resiliency.

The resilient pad may be impregnated or coated with a suitable substance in order to protect the pad from the oil in the crank case of the engine. However, if it is deemed more desirable, the pad may be protected by a cap member 4. The resilient pad cap 4 is provided with a plate portion $4a$ which separates the pad from the lower surface of the shank member. Side portions or aprons 4b extend downwardly around the sides of the resilient pad. The lower portions 4c of these aprons form a suitable joint with the upper side portion 2c of the bearing member 2 which prevents or reduces to a minimum, the likelihood of oil getting on the pad 3.

The bearing member 2 is provided with a semi-cylindrical bearing portion 2b similar to the bearing portions of conventional connecting rods. A bearing cap member 5 having a semi-cylindrical bearing portion 5a which complements the bearing portion 2b is adapted to be secured to the bearing 2 and join the lower portion of the connecting rod to the crank shaft of the engine.

The shank member, resilient pad, bearing member and bearing cap are all secured together by means of two or more bolt members 6. Each bolt member is provided with a pair of lugs 6a extending in opposite directions intermediate the ends thereof. These lugs 6a fit in recessed portions provided in the upper plate portion 2a of the bearing member 2, near the sides thereof, as shown in the drawings. The upper surface of the lugs 6a preferably form a continuation of the plate portions 2a. The portions of the bolt members 6 below the lugs 6a extend through the side portions 2d of the bearing member 2 and the bearing cap 5 and protrude from the bearing cap member 5 so as to receive nuts 7 which are preferably held in place by means of cotter pins 9, or in any other conventional manner.

The upper portions of the bolts 6 extend through the resilient pad 3, through the cap 4, if such is used, and through the ear portion 1c of the shank member. Nuts 8 hold the shank, resilient pad and bearing member in proper relation, but permit compression of the resilient pad. Cotter pins 9 or other means hold the nuts in position regardless of the tensional strain or lack of strain placed thereon. The lugs 6a enable the bearing member and bearing cap member 5 to be secured together independently of the shank portion, thus permitting adjustment of the crank shaft, connecting rod bearing.

The nuts 8 are screwed down upon the upper portions of the bolts until the shank portion is rigidly secured to the bearing member as far as ordinary compression strains are concerned, but loose enough to permit additional compression of the resilient pad when the crank shaft is under abnormal compression strain such as occurs at the beginning of the explosion stroke in an internal combustion engine. Thus the resilient pad tends to absorb the shock which would normally pass to the bearing and thereby saves the wear thereon.

It can be seen that by loosening the nuts 7 and manipulating the crank shaft a bit, it is possible to remove the nuts 8 and replace the pad when the pad becomes worn.

It is obvious from the construction as illustrated in the drawings and described in the foregoing specification that there is provided a connecting rod as aimed at and set forth in the objects of the invention, and though I have shown and described a particular construction, combination and arrangement of parts and portions, I do not wish to be limited to this particular construction, combination and arrangement but desire to include in the scope of my invention the construction, combination, and arrangement substantially as set forth in the appended claims.

Having thus described my invention, what I claim as new and desire to secure by Letters Patent is:

1. In a connecting rod, a shank member, a bearing member, a bearing cap therefor, bolt means for securing said bearing member and said bearing cap together, said bolt means also adapted to secure said shank member to said bearing member independent of the connection between said bearing member and said bearing cap and resilient means positioned between said shank and said bearing member.

2. In a connecting rod, a shank member, a bearing member, a resilient pad positioned between said shank member and said bearing member, and a cap means supported between said shank member and resilient pad and extending around the sides of said pad for encasing and protecting said resilient pad from deleterious matter.

3. In connecting rod, a shank member, a bearing member, a resilient pad positioned between said shank member and said bearing member, means for securing said shank member to said bearing member and permitting the compression and expansion of said resilient pad, and a cap means supported between said shank member and said resilient pad and extending around the sides of said pad for encasing and protecting said resilient pad from deleterious matter.

4. In a connecting rod, a shank member securable by its one end to a piston, a bearing member securable to a crank shaft, a resilient pad positioned between said shank member and said bearing member, means for securing said shank member to said bearing member and permitting the compression and expansion of said resilient pad, and a cap means supported between said shank member and said resilient pad and extending around the sides of said pad for encasing and protecting said resilient pad from deleterious matter.

5. In a connecting rod, a shank member, a bearing member, a cap therefor, bolt means for securing said bearing member and said cap together, said bolt means also adapted to secure said shank member to said bearing member independent of the connection between said bearing member and said cap, resilient means positioned between said shank and said bearing member, and means for encasing and protecting said resilient pad from deleterious matter.

6. In a connecting rod, a shank member securable at its one end to a piston, a bearing member, a cap therefor, bolt means for securing said bearing member and said cap together around crank shaft bearing, said bolt means also adapted to secure said shank member to said bearing member independent of the connection between said bearing member and said cap, resilient means positioned between said shank and said bearing member, and apron means extending around the sides of said resilient pad for protecting the same from deleterious matter.

In testimony whereof, I have hereunto set my hand at San Diego, California, this 16th day of October, 1928.

DANIEL E. ENRIGHT.